Dec. 21, 1965  C. E. STUART  3,224,096
DENTAL ARTICULATOR
Filed Oct. 1, 1962  3 Sheets-Sheet 1

INVENTOR.
CHARLES E. STUART
BY C. G. Stratton
ATTORNEY

Dec. 21, 1965 C. E. STUART 3,224,096
DENTAL ARTICULATOR
Filed Oct. 1, 1962 3 Sheets-Sheet 2
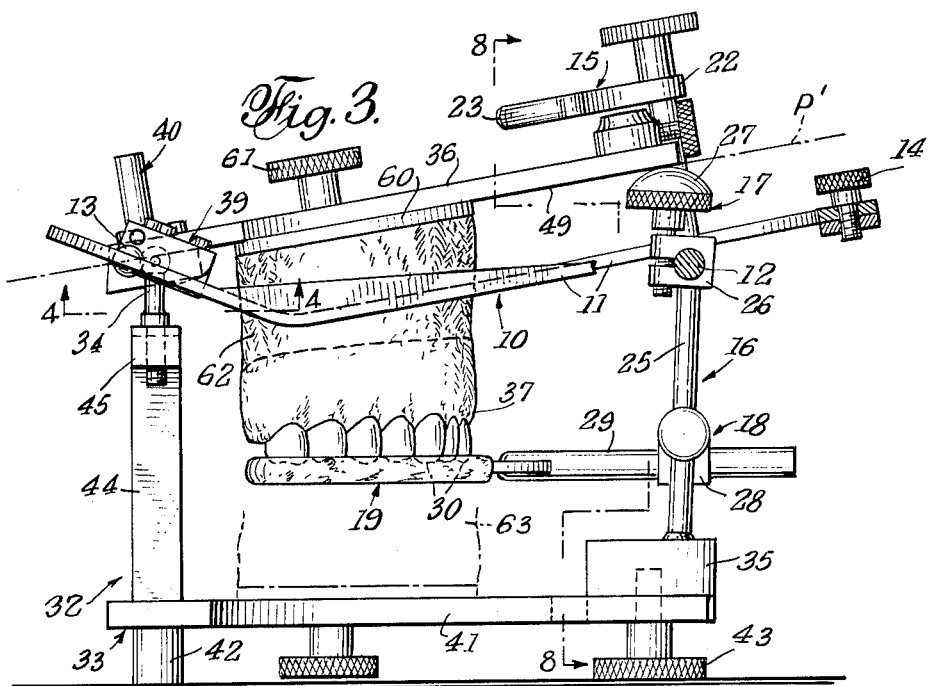
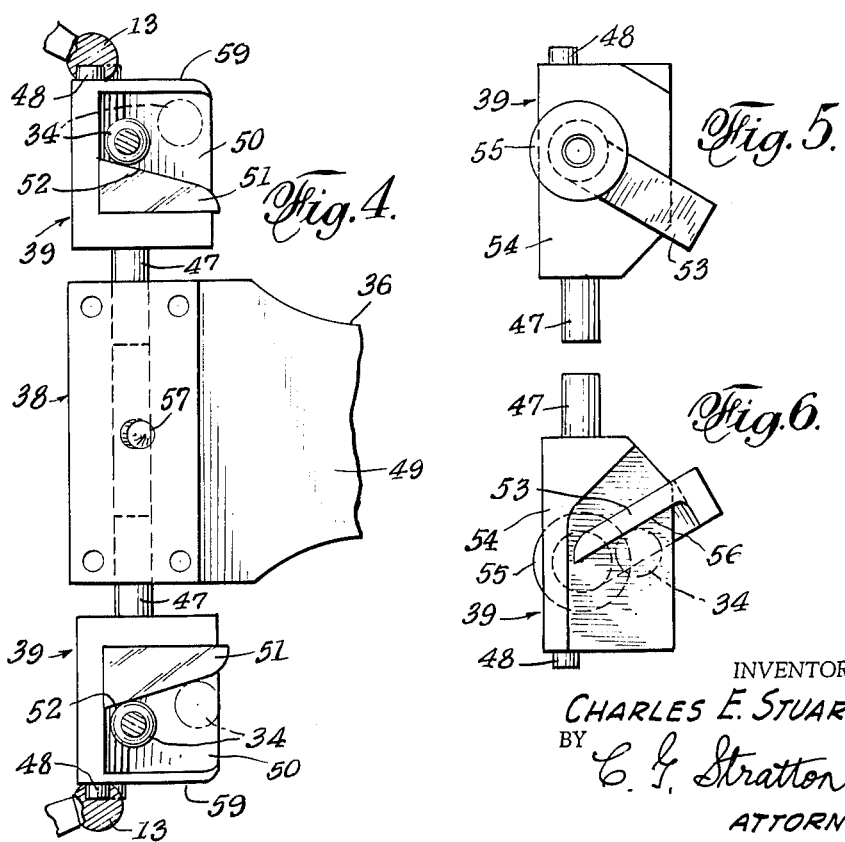
INVENTOR.
CHARLES E. STUART
BY C. G. Stratton
ATTORNEY Dec. 21, 1965 C. E. STUART 3,224,096
DENTAL ARTICULATOR
Filed Oct. 1, 1962 3 Sheets-Sheet 3
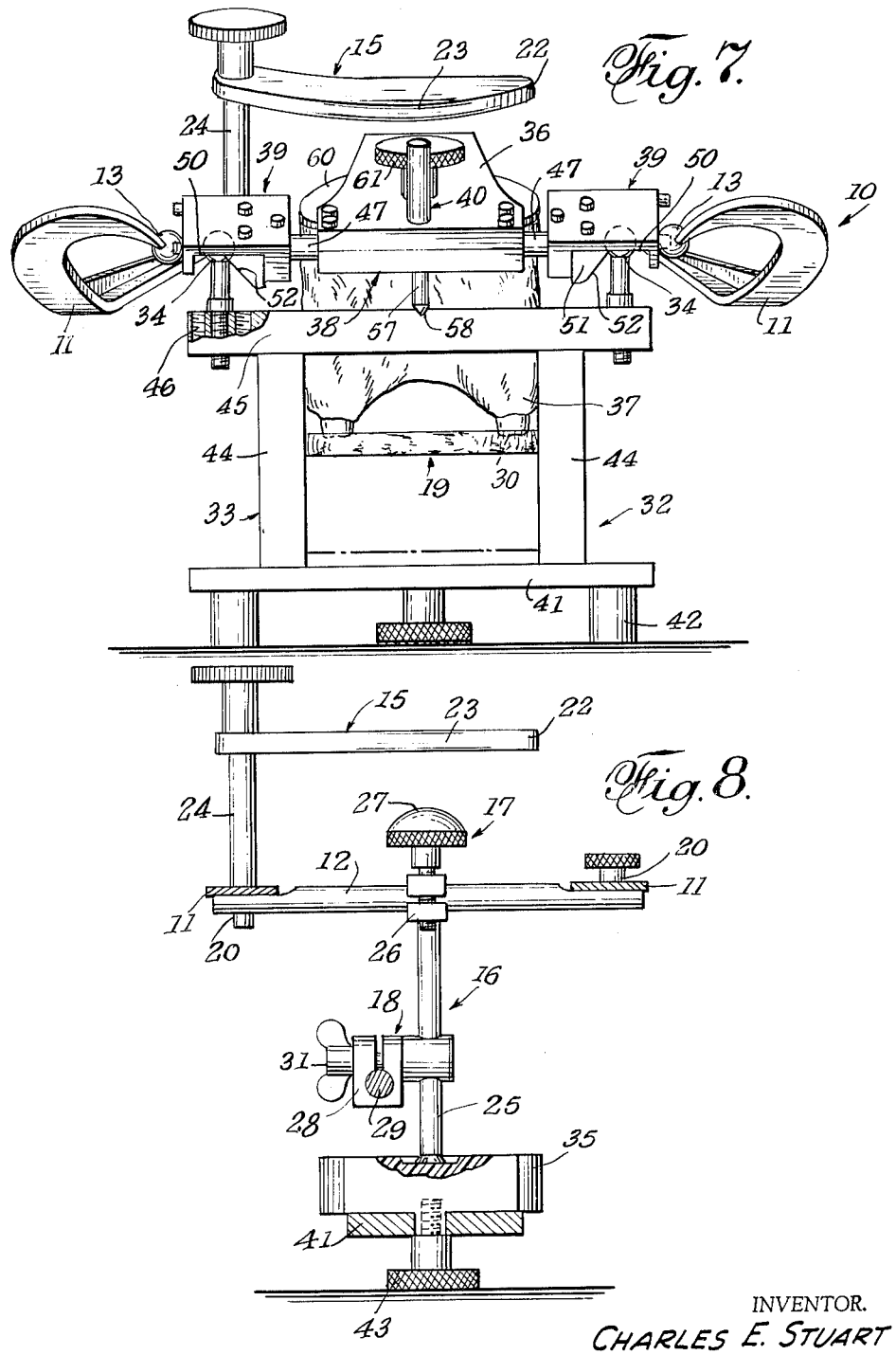
INVENTOR.
CHARLES E. STUART
BY C. G. Stratton
ATTORNEY

United States Patent Office 3,224,096
Patented Dec. 21, 1965

3,224,096
DENTAL ARTICULATOR
Charles E. Stuart, P.O. Box 891, Ventura, Calif.
Filed Oct. 1, 1962, Ser. No. 227,309
6 Claims. (Cl. 32—32)

This invention relates to a method and apparatus, and has for an object, to establish the disposition of the bite fork relative to the orbital plane of the human head and to transfer the same to an articulator so that the tooth impressions on said fork guide mounting, on said articulator, of a model of the upper teeth of said head in the same relationship to the transferred orbital plane on the articulator as the teeth have to the orbital plane of the head. The present method and apparatus, thereby, enable an accurate relationship to be established between said model of the upper teeth and a model of the lower teeth, and afford a method and means for studying the relationship, under all relative positions of said models in simulation of the jaw movements of said head, of the interplay of the cusps of the teeth of said models.

Another object of the invention is to provide a novel face bow that is engaged with the depressions, anterior and medial, of the tragi of the ears and with the nasion, to establish an orbital plane on said bow in relation to a bite fork carried by the bow. Since the mentioned ear depressions are only approximately one-quarter inch posterior to the condyle joints of the jaw from which the true auriculo-infraorbital plane extends, to approximately one inch below the nasion, the orbital plane established with said depressions as the primary reference, rather than the condyle joints (which are hidden), provides a reasonably accurate reference plane for the purposes of this invention.

A further object of the invention is to provide a novel articulator on which said face bow is adapted to be mounted, so that the orbital plane established by the latter is accurately transferred to the articulator to guide the mounting of a model of the upper teeth, as above referred to.

A still further object of the invention is to provide an articulator that embodies novel means simulating the condyle joints of the human jaw and its articulative movements, together with means that relate said condyle joint-simulating means with a reference to the depressions, anterior and medial, of the tragi.

This invention also has for its objects to provide a novel, economical and convenient method or process of superior utility, and to provide apparatus that is positive in operation, convenient in use, easily installed in working position and easily disconnected therefrom, economical of manufacture, relatively simple, and of general superiority and serviceability.

The invention also contemplates novel combinations of method steps as well as novel details of construction and novel combinations and arrangements of parts, which will appear more fully in the course of the following description, which is based on the accompanying drawings. However, said drawings merely show and the following description merely describes, the invention with respect to preferred methods and apparatus, the same, nevertheless, being given by way of illustration or example only.

In the drawings, like reference characters designate similar parts in the several views.

FIG. 3 is a side elevational view of the face bow and articulator and showing the establishment of the orbital plane of the face bow on the articulator and the manner of mounting a model of the upper teeth in proper relationship to the articulator.

FIG. 4 is a bottom plan view as taken on the line 4—4 of FIG. 3, and showing one form of condyle-joint-simulating means.

FIG. 5 is a top plan view of a modified form of condyle-joint-simulating means.

FIG. 6 is a bottom plan view thereof.

FIG. 7 is an elevational view as seen from the left of FIG. 3.

FIG. 8 is a vertical cross-sectional view as taken on the line 8—8 of FIG. 3.

Figure 1:
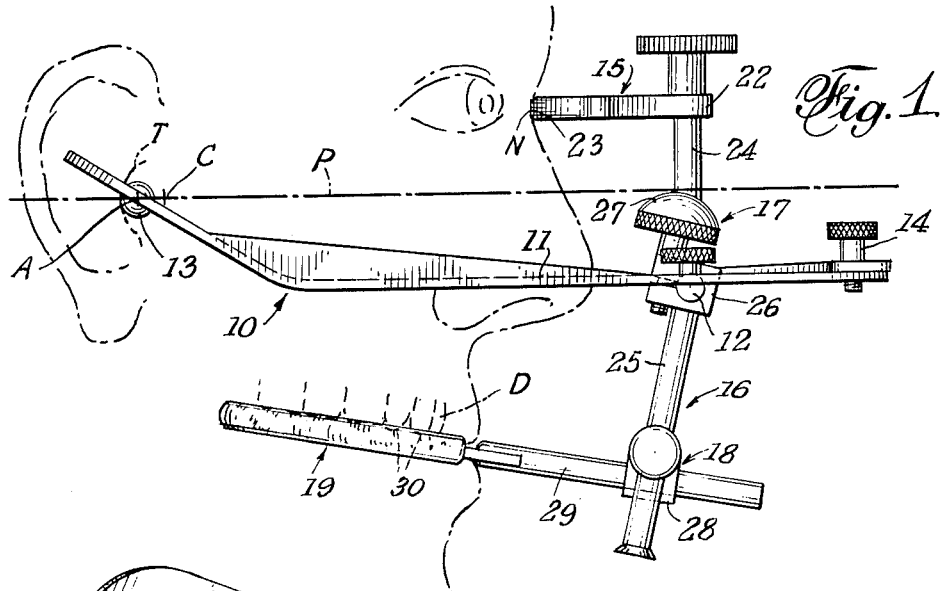
FIG. 1 is a side elevational view of a face bow according to the present invention, and shown in operative association with a human head to establish the orbital plane while tooth depressions are being made on a bite fork, mounted on said face bow, by the teeth of said head.

FIG. 1 shows a human face in which the tragus T is shown as posterior to a point C that represents the axis of the condyle joint, the depression anterior and medial to the tragus being indicated by a point A which, as can be seen, is but slightly posterior to the condyle axis C. Said figure also shows the nasion N of said face and the upper teeth D. The orbital plane P that is to be established by means of the present face bow and transferred to the articulator, is shown as extending from the point A, anteriorly, about one inch below the nasion.

The present face bow 10 comprises, generally, a pair of arms 11, a connecting bar 12 spacing said arms and on the ends of which the same are pivotally movable, a ball 13 on the end of each arm for entry into the mentioned depressions A with the bar 12 forward of the nose, means 14 to lock said arms 11 in adjusted relation according to the transverse spacing of the depressions A, a nasion gauge 15 carried by one of said arms 11 preferably at its pivotal connection with the bar 12, a laterally and angularly adjustable member 16 mounted on said bar 12, a member 17 carried by the member 16 and spaced one inch below the level of the nasion gauge 15, and a fitting 18 on the member 16 to mount a bite fork 19.

Figure 2:
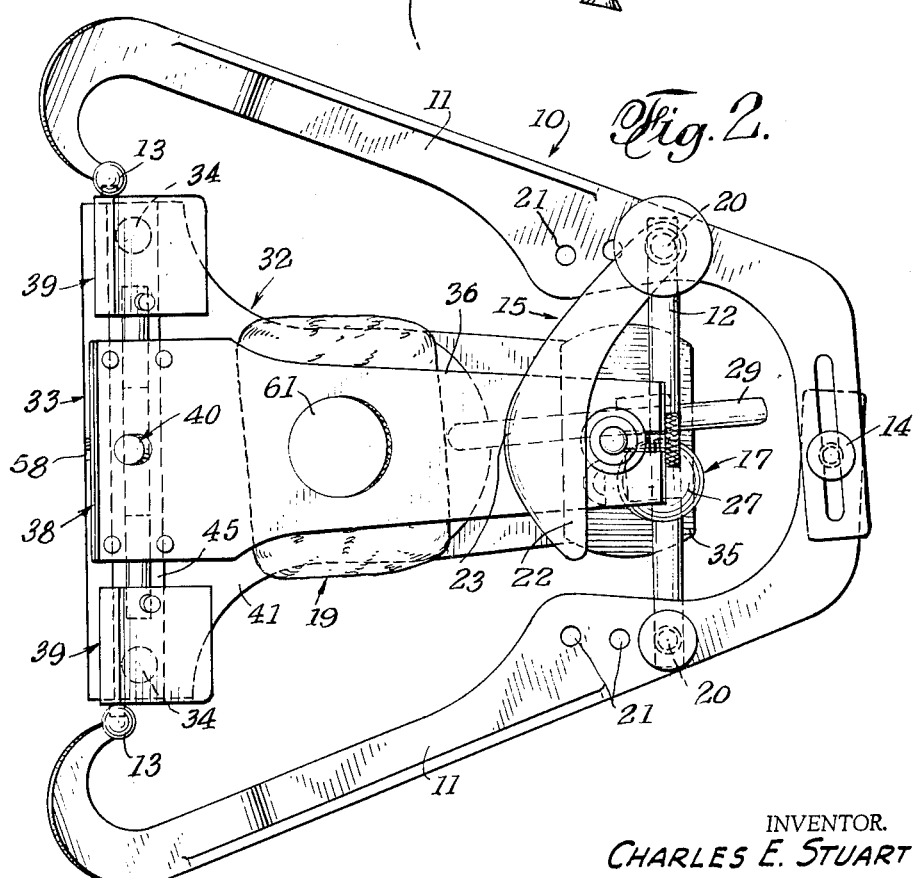
FIG. 2 is a plan view showing the face bow of FIG. 1 mounted on an articulator, according to the invention.

The arms 11 are substantially alike and, as seen in FIG. 2, are formed to accommodate the face between them when the balls 13 are entered, from each side, into the depressions A. The means 14 is shown as a clamp screw that locks the arms in such adjusted relation. For smaller heads, the pivots 20 of said arms on the ends of bar 12 may be selectively shifted to the holes 21, thereby affording a wide range of adjustment of the arms 11.

The nasion gauge 15 is shown as a finger 22 with a rounded edge 23, said finger being swingable on the axis of a stud 24 into contact with the nasion.

The member 16 comprises a rod 25 with a clamp fitting 26 that is engaged over the bar 12 and extends normal to said bar. The fitting is slidable along the bar to any desired adjusted position and is also rotatable around the axis of said bar. The member 17 constitutes screw means for securing the clamp fitting 26 and is provided with a domed top 27 that, because of its domed form, defines the plane P that extends from point A, although the rod 25 may be pivotally adjusted, as indicated.

The fitting 18 is slidably adjustable on rod 25 and is provided with a clamp 28 that may tighten around a shaft extension 29 of the bite fork 19. The latter is more or less conventional, being covered by a wax coating into which depressions 30 are formed by the teeth D. It will be clear that the bite fork, since it is clamped by the teeth D and the teeth in the jaw, may extend at various angles with respect to the orbital plane P according to different craniometry of different heads. When wing screw 31 is taken up, the adjusted angle of the bite fork is locked with relation to said plane P. In this condition, the face bow 10 may be removed from the face and mounted on the articulator 32.

The articulator 32 comprises, generally, a base frame 33, a pair of condyle balls 34 extending fixedly upward from said base frame although the transverse spacing thereof may be adjusted, a pad 35 on said frame forwardly spaced from the condyle balls, a plate 36 for mounting a model 37 of the teeth D, stud-clamping means 38 on the rearward end of plate 36, a pair of fossae-like members 39 adjustably carried by the means 38 and extending laterally and in support engagement with the condyle balls 34, and means 40 to center the plate 36 relative to the base frame 32.

The base frame 33 is shown as a bottom horizontal plate 41 that is supported in level position by rear legs 42 and a clamp screw 43 that serves to lock the pad 35 in adjusted position on said plate 41. Said frame 33 is provided with vertical members 44 that extend upwardly from the rear portion of plate 41, and with a cross bar 45 across the top of said members 44. As viewed from the side (FIG. 3), said base frame is L-shaped. Screw seats at 46 (FIG. 7) indicate the transverse spacing adjustment of the condyle balls 34.

The pad 35 may be longitudinally adjusted along the frame plate 41 and, as above explained, locked in adjusted position by the clamp screw 43.

The plate 36 and means 38 thereof adjustably clamp laterally extending studs or trunnions 47, which are provided on the fossae-like members 39, in a manner to enable lateral adjustment of said members. With the members 39 supported on the condyle balls 34, the forward end of plate 36 extends in support contact with the domed top 27 of the member 17 when the balls 13 of the arms 11 of the face bow 10 are engaged against the outer lateral faces of the fossae members 39. To this end, each member 39 is provided with a lateral projection 48 that fits a recess provided in each ball 13, as may be seen in FIG. 4, the members 39 being laterally adjustable in the means 38, accordingly. It will be clear that the under face 49 of the plate 36 represents the transferred orbital plane P', since the same has the same relationship to the bite plate 19 when the face bow 10 is being used as in FIG. 1 and as in FIG. 3.

The model 37 is the conventional reproduction of the upper set of teeth of a mouth, having been previously prepared in the usual way.

As shown best in FIG. 4, each fossae member 39 has a generally rectangular form and a downwardly facing hollow 50 in which a cam or guide element 51 may be secured. As seen in said FIG. 4, the condyle balls 34 are spaced according to the cam edges 52 of said cams, it being understood that a group of differently designed cams for different condyle paths, and the cams or guides chosen, have the particular characteristics of the condyle joints. Reference is made to applicant's Patent No. 2,816,360, in this connection. It will be noted that the projections 48 are offset rearwardly with relation to the condyle balls 34, when the latter hold the plate 36 in centered relation to said balls, as in FIG. 4. The degree of offset approximates the offset between the point A and the condyle axis C of FIG. 1. Thus, although the balls 13, when engaged with projections 48 of the articulator 32, are spaced from the dome 27 the same distance as the point A is spaced from said dome, the point of pivot of the plate 36 and the tooth model 37 carried thereby is the common axial center of the condyle balls. Hence, transferred orbital plane P' pivots on the true pivot although the transfer was made from the pivot A which is posterior to the true condyle pivot. FIG. 3 also shows that the fossae may be tilted on the axis of the trunnions 47 for rotational adjustment that is locked by the clamp means 38.

The modification of FIGS. 5 and 6 shows the fossae-like members 39 in a design that uses an angularly adjustable member 53 instead of a selective guide cam 51 of a group of different cams. Said member 53 may be locked to a base member 54 by means of a clamp screw 55. It will be clear that the member 53 will provide a cam face 56 that is adjustable to the desired tangential engagement with a condyl ball 34. In other respects, said fossae are similar to the earlier-described forms.

The means 40 may comprise a spring-biased detent 57 that is urged to resiliently engage a notch 58 in the frame bar 45, the same affording a reference that vertically aligns the plate 36 with the base plate 41.

The present method for establishing the proper relationship of the models of both sets of teeth and to guide the interplay of the cusps of said teeth so they will have the same relationship and interplay when molded into dentures for use in the mouth, is practiced in the following manner.

A bite fork is first prepared, inserted in the mouth and gripped between the teeth. The fitting 18 is then loosely slid over the extension 29 of the bite fork. With the lock means 14 loosened, the balls 13 are inserted into the mentioned depressions in the ears that are anterior and medial to the tragi, so the bow may be swung on the horizontal pivot afforded by said balls on the axial points A and the gauge 15 swung into contact with the nasion N. In this position, the fitting 18 is tightened to clamp the same to the rod 25 of the member 16 and to clamp the extension 29 to said fitting. Since the dome 27 of the member 17 is spaced a predetermined distance below the level of said gauge, locking of the means 14 locks the face bow with the bite fork 19 in accurate relationship to the orbital plane P.

After first laterally adjusting the fossae members 39 so their outer faces 59 are spread according to the space across the balls 13 of the face mask, the face bow is applied to the articulator by resting the end of the rod 25 upon the pad 35 of the articulator and engaging the recesses in the balls 13 with the lateral projections 48 of said fossae. The plate 36 is allowed to drop down on the dome 27 and any desired angular adjustment of the fossae may be made to bring the balls 13 and the condyle balls 34 in the plane of the under face 49 of the plate 36. Since the bite fork 19 is fixed to the member 16 and said member, by its clamp 26, is fixed to the bar 12, the relationship between said face 49, i.e., the original orbital plane P, and the bite fork 19 is retained, albeit the fork has a generally horizontal disposition rather than the angled position of FIG. 1.

The depressions 30 in said bite fork are now used for locating the model 37 on said fork in exactly the same relationship that the teeth D had to said fork when making said depressions. Now, the plate 60 is slid along the plate 36 and locked thereto by a clamp screw 61 to be approximately vertically aligned with the model 37. Then, plaster of Paris 62 is filled in between plate 60 and the model 37, as shown in FIG. 3. When said plaster is set, the bite fork is removed with assurance that the teeth of the model 37 have the same relationship to the orbital plane P' on the articulator as the teeth D have to the orbital plane P of the head of FIG. 1.

Now, the model 63 of the lower teeth may be mounted on the base plate 41 of the frame 33 with the teeth thereof in interlocking relation with the teeth of model 37 as established by use of known techniques and employing a bite strip or sheet to establish desired clearance.

Although in the head the jaw and its teeth articulate relative to the teeth fixed in the head, the present articulator, by the means of the condyle balls 34, supports the upper model 37 for articulative movement relative to the model 63. The effect is the same, since under control of the fossae devices 39, the interplay of the teeth cusps, as guided by the cam faces 52 or 56, as the case may be, may be studied and correction made in the inter-relationship of the models 37 and 63 before the final dentures are produced from said models.

The frame 32 is shown as gravitationally supporting the plate 36 and the fossae 39, but any desired means, such as magnetism, elastic bands, or springs, may be used to connect the frame 32 and said plate 36 and fossae 39 while providing for articulation, as above described, between the models 37 and 63. The articulator may be held in both hands and the models moved relatively to study the interplay of the teeth from all sides.

While the foregoing illustrates and describes what is now contemplated to be the best mode of carrying out the invention with respect to both the method and apparatus, the same is, of course, subject to modification without departing from the spirit and scope of the invention. Therefore, it is not desired to restrict the invention to the particular method steps or combination or sequence of steps described, nor to the particular forms of construction illustrated and described, but to cover all equivalents or modifications of method and apparatus that may fall within the scope of the appended claims.

Having thus described the invention, what is claimed and desired to be secured by Letters Patent is:

1. In a dental articulator having a base for mounting a lower tooth model, and having an upper member for mounting an upper tooth model related to the lower model,
   (a) two condyle ball members in transversely spaced relation carried by the base,
   (b) means to adjust the transverse spacing of said condyle ball members on fixed increments of adjustments,
   (c) a pair of fossae-like units adjustably carried by the upper member of the articulator for adjustment of said units to conform to the adjustment of the condyle ball members,
   (d) and trunnions extending between the fossae-like units and the opposite lateral edges of said upper member, the fossae-like units being both laterally extensible and rotationally adjustable on said trunnions with relation to said upper member.

2. In a dental articulator having a base for mounting a lower tooth model, and having an upper member for mounting an upper tooth model related to the lower model,
   (a) two condyle ball members in transversely spaced relation carried by the base,
   (b) means to adjust the transverse spacing of said condyle ball members on fixed increments of adjustments, and
   (c) a pair of fossae-like units adjustably carried by the upper member of the articulator for longitudinal adjustment of said units to conform to the mentioned adjustment of the condyle ball members,
   (d) each said fossae-like unit being provided with an angularly adjustable member mounted on an axis transverse to the longitudinal distance between the condyle ball members and having guiding engagement with lateral portions of said condyle ball members.

3. In a dental articulator according to claim 2, each said fossae-like unit having a downwardly-facing wall for support and guide engagement with the top portions of said condyle ball members.

4. In a dental articulator having a base for mounting a lower tooth model, and having an upper member for mounting an upper tooth model related to the lower model,
   (a) two condyle ball members in transversely spaced relation carried by the base,
   (b) means to adjust the transverse spacing of said condyle ball members on fixed increments of adjustments,
   (c) a pair of fossae-like units adjustably carried by the upper member of the articulator for adjustment of said units to conform to the adjustment of the condyle ball members,
   (d) and means for adjusting the inter-condylar distance between said fossae-like units and the upper member and for similarly adjusting the condyle paths of said fossae-like units,
   (e) the latter means including a pair of aligned trunnions between the fossae-like units and the opposite lateral edges of said upper member.

5. In a dental articulator having a base for mounting a lower tooth model, and having an upper member for mounting an upper tooth model related to the lower model,
   (a) two condyle ball members in transversely spaced relation carried by the base,
   (b) two fossae-like units laterally and rotationally adjustably carried by the opposite side edges of the upper member of the articulator,
   (c) said units each having a downwardly-facing wall for support and guide engagement with the top portions of the condyle ball members, and
   (d) each fossae-like unit including an angularly adjustable member on a pivot transverse to the general plane of the downwardly-facing wall for guiding engagement with lateral portions of the condyle ball members.

6. A fossae-like unit for engagement with a condyle ball member fixedly mounted on a dental articulator, said unit comprising:
   (a) a base member having a downwardly-facing wall for support and guide engagement with the top of said ball member, and
   (b) an angularly adjustable member carried by said base member on a pivot transverse to the general plane of the downwardly-facing wall for guiding engagement with a lateral portion of the condyle ball member.

References Cited by the Examiner
UNITED STATES PATENTS

| 1,052,806 | 2/1913 | Evans | 32—20 |
| 1,703,105 | 2/1929 | Hawksworth | 32—20 |
| 2,816,360 | 12/1957 | Stuart | 32—32 |
| 3,048,923 | 8/1962 | Franwick | 32—32 |
| 3,052,030 | 9/1962 | Spence | 32—32 |
| 3,084,438 | 4/1963 | Goodfriend | 32—20 |

RICHARD A. GAUDET, *Primary Examiner.*
ROBERT E. MORGAN, *Examiner.*